Oct. 5, 1926.
E. H. GOLD
HOSE COUPLING
Filed March 10, 1922
1,601,960
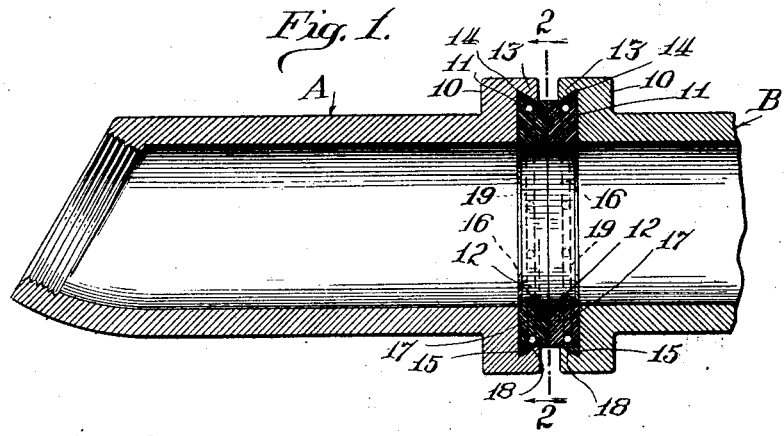
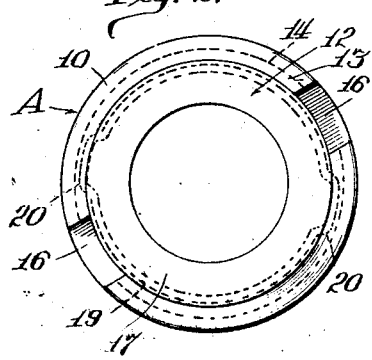
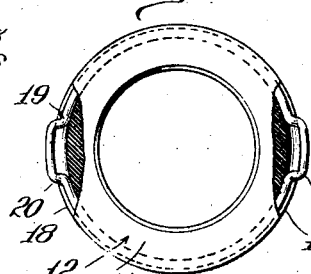
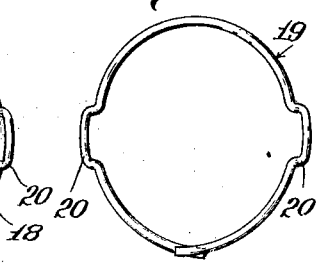
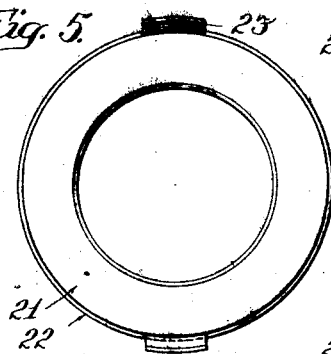
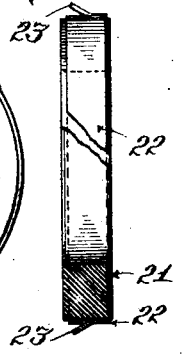
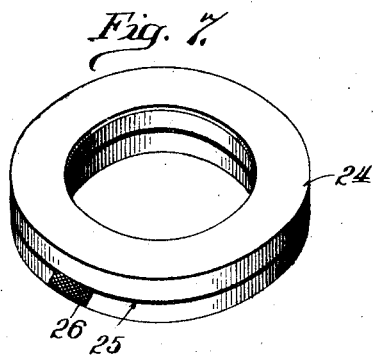
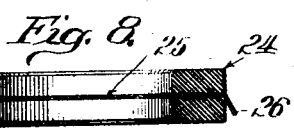
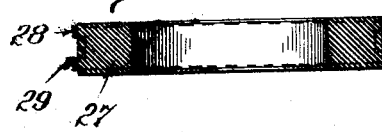
Inventor Patented Oct. 5, 1926.

1,601,960

UNITED STATES PATENT OFFICE.

EGBERT H. GOLD, OF CHICAGO, ILLINOIS.

HOSE COUPLING.

Application filed March 10, 1922. Serial No. 542,634.

My invention relates to a hose coupling, and more especially to a coupling of the types employed for disengageably joining together the rubber hoses, or equivalent flexible metal conduits, for making the connection between the train pipes of adjacent railway cars. The invention is concerned particularly with an improved gasket for insuring a fluid tight joint between the mating coupler heads, and its principal object is to provide an inexpensive gasket that may be readily inserted into and removed from the coupler head, the gasket and head being provided with engaging means for holding the gasket reliably in place, which engaging means does not project into so as to obstruct the port through the coupling.

The invention is illustrated in connection with a coupling of the type shown in the patents to Russell & Harriman 1,346,421, July 13, 1920 and Edward N. Roth 1,346,424, July 13, 1920, in which each of the mating coupling elements consists of a coupling member and a conduit or gasket holding member which latter is forced against the gasket holding member of the mating element by a rotary cam interposed between said coupling and conduit members, as shown and described in the patents referred to. The gaskets of my invention may, however, be employed with couplers of other types by suitable construction of the parts in which the gaskets are arranged.

The accompanying drawings show the invention in certain preferred alternative embodiments. In the drawings Fig. 1 is a longitudinal sectional view showing, fragmentarily, the conduit or gasket holding members of a coupling of the type described in the patents above referred to modified so as to be suitable for and provided with the gasket of my invention.

Fig. 2 is a sectional view taken on line 2—2 of Fig. 1, that is to say, in a plane between the engaged gasket faces.

Fig. 3 is a face view, in elevation, with parts in section, of the gasket.

Fig. 4 is a detail view of the engaging wire employed in connection with the gasket shown in Figs. 1, 2 and 3.

Fig. 5 is a face view, and Fig. 6 an edge view, partly in section, of a modified form of gasket.

Fig. 7 is a view in perspective of another modification.

Fig. 8 is a cross sectional view of the form of gasket shown in Fig. 7, and

Fig. 9 is a view, similar to Fig. 8, showing another modification.

Referring first to Figs. 1 to 4 inclusive, A and B designate the conduit or gasket holding members of a coupling of the type illustrated in the patents above referred to. For clearness the other parts of the coupling are omitted. The members A and B are each provided with a gasket, and, in coupling together the parts of the coupling these members are forced toward each other so as to bring their gaskets in intimate contact with each other.

The conduit or gasket holding member is formed with an enlarged portion 10 at its forward end providing a recess 11 for the gasket 12. The outstanding rib or flange 13 which constitutes the recess for the gasket is formed with an undercut groove 14, the inner face 15 of the flange 13 being preferably conical, or approximately so. The rib 13 is cut away at diametrically disposed places 16, 16. Preferably the undercut groove 14 extends continuously around the flange 13 (except as interrupted by the cutting away of the flange) but this is not essential.

The gasket, in the form shown in Figs. 1, 2 and 3, consists of an annular body 17 of relatively hard rubber-like material, such as is commonly used for gaskets in couplings of this type, said body being formed on its outer perimeter with a circumferential groove or recess 18. Arranged in this groove or recess is a wire 19 bent to a substantially circular form but with diametrically arranged projections 20. The wire is given a set originally, as shown in Fig. 4, so that when sprung over the gasket it will be retained firmly in the groove 18 thereof. The projections 20 on wire 19, by entering the undercut recess 14 in the gasket holding member of the coupler, provides a means for holding the gasket in position in the coupler without obstructing in any way the port through the coupling as is the case with certain types of gasket holders heretofore used. The gasket is put in place by aligning the projections 20 with the recesses 16 in the flange 13, and then rotating the gasket so as to bring the projections under the overhanging lip formed on flange 13. The parts are preferably designed so that a certain pressure is exerted between the projections 20 and the conical surface 15 on the inside of the flange, which pressure tends to keep the gasket from being moved accidentally or through vibration to an angular position which would permit it to fall from the coupler. Of course, such disengagement could only take place in case the coupler were disengaged from its mating coupler.

A modified form of gasket is shown in Figs. 5 and 6. The gasket body 21 is provided with a metal ferrule 22 having ears 23 struck out from the same at diametrically arranged places, these ears taking the place of projections 20 on wire 19 employed in the gasket as shown in the preceding figures.

Another modification is shown in Figs. 7 and 8. In this form of the invention the gasket body 24 is molded upon an annulus 25 of reticulated wire fabric, this annulus being provided with diagonally arranged projecting ears 26 to enter the undercut groove in the coupler.

Another form of the invention is illustrated in Fig. 9. Here the gasket body 27 is provided with a metal ferrule 28 formed with outstanding ears 29 which are bent out so that they stand at an acute-angle to the portion of the ferrule lying beyond them, this arrangement giving greater stiffness to the holding ears than is the case with the ears 23 of the form shown in Figs. 5 and 6.

As it is realized that further modifications might be made without departure from the principles of the invention, I wish it to be understood that the invention is not to be considered as limited to the specific constructions shown and described except so far as the appended claims are expressly so limited.

I claim:

1. For use in combination with a coupler the face of which is formed with a gasket seat having an overhanging edge cut away to provide spaced recesses, a gasket having an unobstructed port and consisting of a body of rubber-like material provided at its periphery with metal projecting members spaced in correspondence with the spaced recesses in the overhanging edge of the coupler, which are formed to bear with holding pressure against said gasket seat to keep the gasket from rotating in said seat.

2. For use in combination with a coupler, the face of which is formed with a gasket seat having an overhanging edge which is cut away at spaced intervals, an annular gasket comprising a gasket body of rubber-like material adapted to seat in the coupler face, and a metallic member engaged with the peripheral portion of the gasket body and having projections adapted to enter the groove formed behind the overhanging edge of the coupler through the cutaway spaces and by rotation of the gasket to engage within this groove, said projections being resilient and formed to take a binding hold in said groove.

3. For use in combination with a coupler, the face of which is formed with a gasket seat having an overhanging edge which is cut away at spaced intervals, an annular gasket comprising a gasket body of rubber-like material adapted to seat in the coupler face and having an annular recess in its periphery, and a metallic member adapted to seat within this recess and formed with outstanding projections adapted to enter the annular groove formed behind the overhanging edge of the coupler through the cut away spaces therein and by rotation of the gasket and metallic member engage within this groove.

4. For use in combination with a coupler, the face of which is formed with a gasket seat having an overhanging edge which is cut away at spaced intervals, an annular gasket comprising a gasket body of rubber-like material adapted to seat in the coupler face and having an annular recess in its periphery, and a wire member adapted to seat within this recess and formed with outwardly bent projections adapted to enter the groove in the coupler formed behind the overhanging edge and by rotation of the gasket engage within this groove.

5. For use in combination with a coupler, the face of which is formed with a gasket seat having an overhanging edge which is cut away at diametrically disposed places, a gasket comprising a gasket body of rubber-like material, and an annular element surrounding and engaged with said gasket body, formed with diametrically arranged projections adapted to enter the groove formed by said overhanging edge through the cut away portions of said edge and by rotation of the gasket, to extend into said groove.

6. For use in combination with a coupler, the face of which is formed with a gasket seat having an overhanging edge which is cut away at diametrically disposed places, a gasket comprising a gasket body of rubber-like material, and an annular element surrounding and engaged with said gasket body, formed with diametrically arranged projections adapted to enter the groove formed by said overhanging edge through the cut away portions of said edge and by rotation of the gasket, to extend into said groove, said projections being resilient and formed so as to take a binding hold in said groove.

EGBERT H. GOLD.